Patented May 15, 1934

1,958,407

UNITED STATES PATENT OFFICE 1,958,407

NICOTINE INSECTICIDE

Thomas J. Headlee, New Brunswick, N. J., assignor to Tobacco By-Products & Chemical Company, Richmond, Va., a corporation of Delaware No Drawing. Application May 18, 1929, Serial No. 364,331

2 Claims. (Cl. 167—34)

This invention relates to insecticides, and more particularly, insecticides employing nicotine as the poison or insect destroying agent.

The invention generally aims to make the insecticide more deadly and effective and to diminish the proportion of nicotine necessary.

It is already known that certain liquids wet, and spread on, the external surfaces of various organisms more readily than other liquids. It is also known that oils, fat solvents, and soap solutions wet the integuments of insects more readily than water when the same methods of application are employed. The addition of such materials to nicotine insecticides has, consequently, been found to increase the killing efficiency of the insecticides because of the increased wetting or spreading power caused thereby.

The efficiency of an insecticide does not, however, depend solely on its spreading or wetting qualities. An insecticide, which penetrates the tracheal or respiratory tubes of insects, is, other things being equal, more efficient in its killing action than one that does not penetrate the tracheal system, or is less effective in that respect. This increase in killing efficiency is due to the fact that penetration of the tracheal system tends to cause death of the insect by suffocation, and especially to the fact that the insecticide passes through the walls of the tracheal system more readily than through the external covering of the insect, thus enters the interior of the insect more easily, and kills it by its toxic action. Furthermore, the surface gas evolved by the insecticide is more deadly in its action when confined within the tracheal system of the insect.

This invention is characterized by the discovery that solutions of certain materials at certain concentrations have surface tensions so low that they will enter the tracheae of insects readily. It has been found that the addition of substantially pure sodium oleate to a nicotine insecticide is very efficient in reducing the surface tension of the insecticide and in effecting the entrance of the insecticide into the tracheae of insects. Particularly is such result to be noted where a solution of substantially pure sodium oleate with a strength of about one-half to two per cent is added to an aqueous solution of nicotine. With the addition of such material, it is possible to obtain lethal results with very high dilutions of nicotine. For example, a solution containing one-half of one per cent sodium oleate with "free" nicotine 1 to 50,000 strength has given excellent results. The use of sodium oleate, consequently, produces increased effectiveness of the insecticide and permits decrease in the amount of nicotine in the solution.

The saving of nicotine is a great advantage, as this material is expensive and its commercial application has been impeded because of the expense. The insecticide of this invention necessitates the employment of a smaller amount of nicotine for the same or greater insect exterminating results, is, therefore, cheaper, and can be sold more readily on the market.

In addition to imparting the tracheal system penetrating qualities to the insecticide, the sodium oleate increases the spread of the aqueous solution, to which it is added, on the integuments of insects, and, in this respect, seems to be superior to materials hitherto employed.

The nicotine used in the insecticide may be either "free" nicotine, or nicotine in a compound state, such as nicotine sulphate. Free nicotine is somewhat more effective in the solution, but nicotine in compound state is suitable also. Compound nicotine, such as nicotine sulphate, can be handled more safely than free nicotine and is consequently often preferred. It is to be understood that the term nicotine, as herein used, covers both free nicotine and nicotine in compound state.

The sodium oleate is the agent for reducing the surface tension of the aqueous carrier of the insecticide to effect penetration into the tracheal system of insects. It does not combine with the nicotine, nor form any chemical compound therewith. On the contrary, the nicotine or nicotine compound is suspended in the solution in uncombined state. This invention is, thus, to be distinguished from an insecticide containing the chemical compound, nicotine oleate.

In lieu of sodium oleate, its chemical equivalent, potassium oleate, may be employed, as it possesses substantially the same properties. This material is embraced by the term, sodium oleate, as used in the claims.

The insecticide herein contemplated is intended especially to be sprayed on leaves, foliage, and other places from which insects are to be exterminated.

What is claimed is:

1. An insecticide consisting of an aqueous solution of nicotine and substantially pure sodium oleate having a strength of about one-half to two per cent.

2. An insecticide consisting chiefly of a solution of substantially pure sodium oleate and nicotine.

THOMAS J. HEADLEE.